US012050027B2

(12) United States Patent
Yang et al.

(10) Patent No.: US 12,050,027 B2
(45) Date of Patent: Jul. 30, 2024

(54) PRODUCTION SYSTEM AND PRODUCTION METHOD OF POTASSIUM MANGANATE

(71) Applicant: Shenzhen Hangxin Trading Co., Ltd., Guangdong (CN)

(72) Inventors: Guan Yang, Guangdong (CN); Liangqin Lin, Guangdong (CN); Junliang Zhao, Guangdong (CN)

(73) Assignee: Shenzhen Hangxin Trading Co., Ltd., Shenzhen (CN)

( * ) Notice: Subject to any disclaimer, the term of this patent is extended or adjusted under 35 U.S.C. 154(b) by 518 days.

(21) Appl. No.: 17/108,594

(22) Filed: Dec. 1, 2020

(65) Prior Publication Data

US 2021/0199339 A1 Jul. 1, 2021

(30) Foreign Application Priority Data

Dec. 26, 2019 (CN) .......................... 201911361380.0

(51) Int. Cl.
*F24H 3/10* (2022.01)
*C01G 45/12* (2006.01)
*F24H 3/04* (2022.01)
*F24H 3/06* (2022.01)

(52) U.S. Cl.
CPC ......... *F24H 3/105* (2013.01); *C01G 45/1214* (2013.01); *C01G 45/12* (2013.01); *F24H 3/0488* (2013.01); *F24H 3/065* (2013.01); *Y02B 30/00* (2013.01); *Y02P 20/10* (2015.11)

(58) Field of Classification Search
CPC ... C01G 45/12; C01G 45/1214; F24H 3/0488; F24H 3/065; F24H 3/105; Y02B 30/00; Y02P 20/10

USPC ....................................................... 122/367.1
See application file for complete search history.

(56) References Cited

U.S. PATENT DOCUMENTS 3,293,160 A * 12/1966 Mazzuchelli ............. C25B 1/28
205/477
5,011,672 A * 4/1991 Garcia ....................... B01J 8/10
423/599

FOREIGN PATENT DOCUMENTS

| CN | 101327939 A | * | 12/2008 |
| CN | 101746830 A | | 6/2010 |
| CN | 201620039 U | | 11/2010 |
| CN | 201620041 U | | 11/2010 |
| CN | 106517348 A | | 3/2017 |
| CN | 106745292 A | | 5/2017 |

(Continued)

OTHER PUBLICATIONS

CN 206278932 U—Translation (Year: 2017).*

(Continued)

*Primary Examiner* — Steven B McAllister
*Assistant Examiner* — Benjamin W Johnson

(57) ABSTRACT

The present disclosure provides a production system and a production method of potassium manganate, belonging to the technical field of production of potassium manganate. The production system of potassium manganate comprises a hot air generating device, a production device and a circulating air pipeline. The hot air generating device is configured provide hot air in a manner of burning fuel gas. The production device is configured to absorb heat in the hot air generated by the hot air generating device. The circulating air pipeline is configured to introduce the hot air passing through the production device into the hot air generating device to adjust temperature of the hot air.

17 Claims, 3 Drawing Sheets

(56) References Cited

FOREIGN PATENT DOCUMENTS

| CN | 206278932 U | * | 6/2017 |
|---|---|---|---|
| CN | 206278932 U | | 6/2017 |
| CN | 107720830 A | | 2/2018 |
| CN | 207596494 U | | 7/2018 |

OTHER PUBLICATIONS

CN 101327939 A—Translation (Year: 2008).*
CN201911361380.0—First Office Action mailed on Dec. 13, 2021, 14 pages.
CN201911361380.0—Second Office Action mailed on Apr. 12, 2022, 9 pages.
CN201911361380.0—Notice of Grant mailed on Aug. 3, 2022, 4 pages.
IN202024056448—Examination Report mailed on Jul. 27, 2022, 6 pages.

* cited by examiner

PRODUCTION SYSTEM AND PRODUCTION METHOD OF POTASSIUM MANGANATE

CROSS-REFERENCE TO RELATED APPLICATIONS

This application claims priority to Chinese Patent Application No. 2019113613800 filed with the Chinese Patent Office on Dec. 26, 2019, entitled "Production System and Production Method of Potassium Manganate", which is incorporated herein by reference in its entirety.

TECHNICAL FIELD

The present disclosure relates to the technical field of production of potassium manganate, in particular, to a production system and a production method of potassium manganate.

BACKGROUND ART

Currently, the production processes of potassium manganate are mostly a solid phase oxidation method (for example, a roasting method using an open-hearth furnace and a pressure oxidation method using a rotary furnace), a liquid phase oxidation method (for example, a three-phase pressure oxidation method, and a method using a pneumatic fluidized tower) and so on. All of the above-mentioned production processes of potassium manganate, using coal as an energy source, have a low heat utilization rate, a lot of dust, high labor intensity, and harsh operation environment, and hardly meet emission standard for the treatment of coal exhaust gas, thus severely polluting the environment. Moreover, in the three-phase pressure oxidation method, different process nodes of the whole production system should be within a suitable range, respectively, then the production of potassium manganate can be facilitated.

SUMMARY

In a first aspect, an embodiment of the present disclosure provides a production system of potassium manganate, including a hot air generating device, a production device and a circulating air pipeline. The hot air generating device is configured to provide hot air in a manner of burning fuel gas. The production device is configured to absorb heat in the hot air generated by the hot air generating device. The circulating air pipeline is configured to introduce the hot air passing through the production device into the hot air generating device, to adjust the temperature of the hot air.

In a second aspect, an embodiment of the present disclosure provides a production method of potassium manganate, applicable to the above production system of potassium manganate, wherein the production method includes: making the hot air generated by the hot air generating device to heat materials in the production device and performing heat preservation, and introducing the hot air passing through the production device into the hot air generating device through the circulating air pipeline, so as to adjust the temperature of the hot air generated in the hot air generating device.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation to the scope, and those ordinarily skilled in the art still could obtain other relevant drawings according to these accompanying drawings, without using any inventive effort, which also fall within the scope of protection of the present disclosure.

Figure 1:
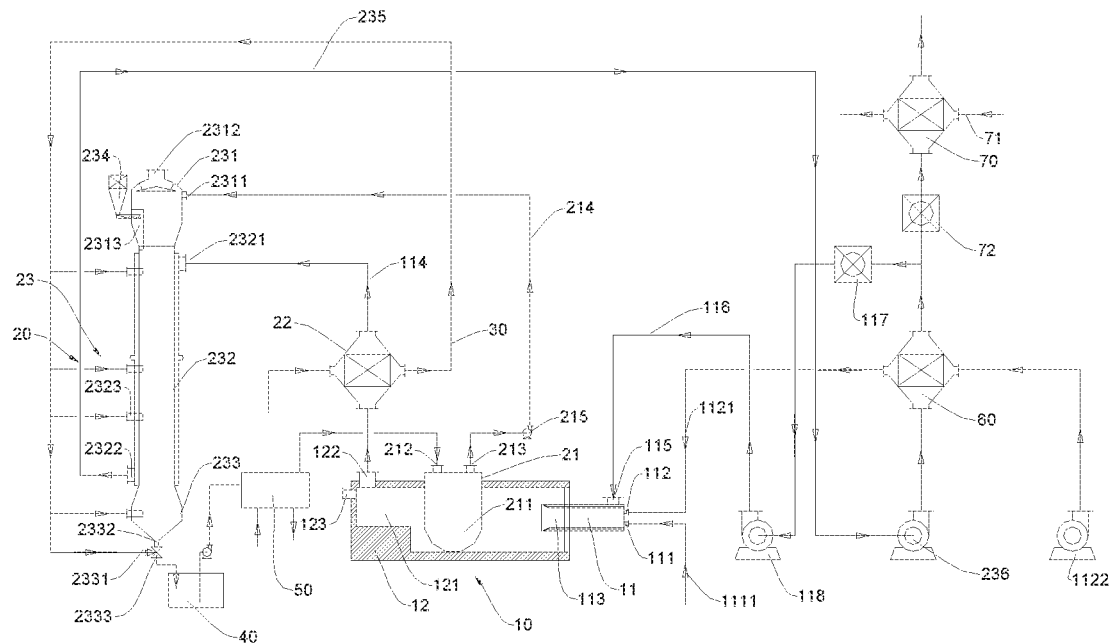
FIG. 1 is a structural schematic view of a flow of a production system of potassium manganate provided in a first embodiment of the present disclosure.

Reference signs: 10—hot air generating device; 20—production device; 11—hot air generator; 12—hot air conveyor; 111—fuel gas inlet; 112—combustion-supporting gas inlet; 1111—fuel gas pipeline; 1121—combustion-supporting gas pipeline; 121—hot air circulation passage; 113—hot air opening; 21—alkali liquor heating device; 22—first heat exchanger; 23—reaction column; 211—inner cavity; 212—alkali liquor inlet; 213—alkali liquor outlet; 122—conveyor hot air outlet; 123—vent port; 231—feeding section; 232—reaction section; 233—separation section; 2311—alkali liquor inlet; 2312—residual air outlet; 2313—manganese mineral powder inlet; 214—alkali liquor pipeline; 215—first liquid delivery pump; 234—spiral automatic feeder; 2321—hot air inlet of reaction column; 2322—hot air outlet of reaction column; 114—second hot air pipeline; 30—reaction gas pipeline; 2323—first reaction gas inlet; 2331—second reaction gas inlet; 2332—drainage port; 40—potassium manganate crystallization device; 50—potassium manganate separation device; 2333—three-way valve; 235—first hot air pipeline; 236—induced draft fan; 60—second heat exchanger; 1122—combustion-supporting gas blower; 70—third heat exchanger; 71—process water pipeline; 115—circulating air inlet; 116—circulating air pipeline; 117—first valve; 118—circulating air blower; 72—second valve.

DETAILED DESCRIPTION OF EMBODIMENTS

In order to make objects, technical solutions and advantages of the embodiments of the present disclosure clearer, the technical solutions in the embodiments of the present disclosure will be described below in conjunction with accompanying drawings in the embodiments of the present disclosure.

An object of the present disclosure is to provide a production system and a production method of potassium manganate, which use a fuel gas as a source of heat, and can adjust the temperature of hot air in the whole production system, thereby facilitating the production of potassium manganate.

In a first aspect, an embodiment of the present disclosure provides a production system of potassium manganate, including a hot air generating device, a production device and a circulating air pipeline. The hot air generating device is configured to provide hot air in a manner of burning fuel gas. The production device is configured to absorb heat in the hot air generated by the hot air generating device. The circulating air pipeline is configured to introduce the hot air passing through the production device into the hot air generating device, to adjust the temperature of the hot air.

In the hot air generating device, the hot air will be generated after combustion of the fuel gas, and after the hot air passes through the production device of potassium manganate, a part of heat in the hot air may be absorbed to heat materials in the production device, so that the materials undergo reaction. After a part of heat in the hot air is utilized, the temperature of the hot air passing through the production device is lowered, and the hot air passing through the production device is again introduced into the hot air generating device through the circulating air pipeline, and may be mixed with hot air generated by combustion of the fuel gas, so as to adjust the temperature of the hot air in the whole production system, to meet the production requirements of potassium manganate. Furthermore, as the hot air passing through the production device is again introduced into the hot air generating device through the circulating air pipeline, residual heat further may be utilized, thereby saving energy and reducing emissions.

In a possible embodiment, the production device includes an alkali liquor (lye) heating device, a first heat exchanger and a reaction column. The alkali liquor heating device is configured to absorb heat in the hot air generated by the hot air generating device and heat an alkali liquor in the alkali liquor heating device. The first heat exchanger is configured to enable an oxygen-enriched reaction gas to undergo heat exchange with the hot air passing through the alkali liquor heating device. The reaction column is configured to receive the heated alkali liquor from the alkali liquor heating device as well as the oxygen-enriched reaction gas and the hot air having undergone the heat exchange from the first heat exchanger. The circulating air pipeline is configured to introduce the hot air passing through the reaction column into the hot air generating device.

The whole production system is a circulation path. The hot air passing through the production device is introduced into the hot air generating device through the circulating air pipeline, and may be mixed with the hot air generated by the combustion of the fuel gas, thereby adjusting the temperature of the hot air output from the hot air generating device, so that the temperature of the hot air passing through the alkali liquor heating device may be controlled, and thus the heating temperature of the alkali liquor heating device may be controlled. Further, after the alkali liquor in the alkali liquor heating device absorbs a certain amount of heat, the temperature of the hot air is lowered and is within a certain range. The hot air passing through the alkali liquor heating device pre-heats the oxygen-enriched reaction gas through the first heat exchanger, so that the temperature of the pre-heated oxygen-enriched reaction gas is within a certain range, and the temperature of the hot air is further lowered to be within a certain range. After the hot air and the pre-heated oxygen-enriched reaction gas are introduced into the reaction column, the temperature inside the column may be kept within a certain range, and the hot air passing through the reaction column is mixed with the hot air from combustion of the fuel gas, so that the temperature of the hot air output from the hot air generating device is controlled. One circulation path is formed in the above manner, and the temperature of each process node in the production system is controlled to be within a certain range, so as to meet the production requirements of potassium manganate. Moreover, the hot air, passing through the alkali liquor heating device, the first heat exchanger and the reaction column in sequence, is introduced into the hot air generating device through the circulating air pipeline, then the residual heat further may be utilized, thereby saving energy and reducing emissions.

In a possible embodiment, the hot air generating device includes a hot air generator and a hot air conveyor. The hot air generator is configured to provide hot air in a manner of burning the fuel gas. The hot air generator is directly connected to and communicated with the hot air conveyor, the hot air conveyor has therein a hot air circulation passage configured for the hot air generated by the hot air generator to pass through, and the hot air circulation passage is provided therein with an alkali liquor heating device.

The hot air generator is directly connected to and communicated with the hot air conveyor, then the hot air generator and the hot air conveyor may be integrated into one piece, without providing a dust removing device therebetween, so that the structure of the whole production system is more compact, and heat loss is reduced.

In a possible embodiment, the alkali liquor heating device has an inner cavity accommodating the alkali liquor, and an outer shell forming the inner cavity is located in the hot air circulation passage. A first end of the alkali liquor heating device is located outside the hot air conveyor, the first end is provided with an alkali liquor inlet and an alkali liquor outlet, and the alkali liquor outlet is in communication with the reaction column.

When the alkali liquor in the alkali liquor heating device is heated at a high temperature, input and output of the alkali liquor will not be affected, and the alkali liquor passing through the reaction column further may be recovered, thus improving the utilization rate of the alkali liquor.

In a possible embodiment, the hot air conveyor is provided with a vent port in communication with the hot air circulation passage, thus avoiding a too high air pressure in the hot air conveyor, and controlling a negative pressure at $-50\sim-10$ Pa, so that the production system is safer to use.

In a possible embodiment, a second heat exchanger and a combustion-supporting gas pipeline are further included. The second heat exchanger is configured to perform heat exchange between combustion-supporting gas and hot air passing through the reaction column. The combustion-supporting gas pipeline is configured to introduce the combustion-supporting gas passing through the second heat exchanger into the hot air generating device. The circulating air pipeline is configured to introduce the hot air having undergone the heat exchange by the second heat exchanger into the hot air generating device.

The combustion-supporting gas may be pre-heated by the second heat exchanger, and the pre-heated combustion-supporting gas is introduced into the hot air generator, so that the temperature of the hot air generated in the hot air generating device may be higher, thus more circulating air is required to adjust the temperature of the hot air, so as to reach a target temperature range. Moreover, the hot air passing through the reaction column is subjected to heat exchange at the second heat exchanger, the temperature of the hot air may be further lowered, and the hot air after the temperature is lowered is introduced into the hot air generating device through the circulating air pipeline, to adjust the temperature of the hot air, and more circulating air is required to adjust the temperature of the hot air, so as to reach the target temperature range. Multi-stage utilization of hot air improves the utilization rate of heat, further reduces the amount of hot air discharged and the temperature of the hot air discharged, and thus achieves the purpose of energy saving and emission reduction.

In a possible embodiment, the circulating air pipeline is provided with a first valve. The circulating air pipeline is configured to introduce the hot air having undergone the heat exchange by the second heat exchanger into the hot air generator.

Through the arrangement of the first valve, the flow rate of the hot air entering the hot air generator after passing through the second heat exchanger may be adjusted, so that excessive hot air is avoided to be introduced into the hot air generator, and the temperature of the hot air output by the hot air generator is avoided to be too high or too low, so as to adjust the temperature of the hot air output by the hot air generator to be within a suitable range. Moreover, the hot air passing through the second heat exchanger is introduced into the hot air generator, and the temperature of the hot air is first adjusted in the hot air generator, so that the temperature of the hot air entering the hot air conveyor is within a suitable range, thereby facilitating heating the alkali liquor in the alkali liquor heating device.

In a possible embodiment, a potassium manganate crystallization device and a potassium manganate separation device in communication with each other are further included, wherein the potassium manganate crystallization device is in communication with a bottom of the reaction column, and the potassium manganate separation device is in communication with the alkali liquor heating device, so that the alkali liquor separated by the potassium manganate separation device enters the alkali liquor heating device.

The materials having reacted in the reaction column enter the potassium manganate crystallization device to be crystallized, then the potassium manganate and the alkali liquor are separated by the potassium manganate separation device, and the alkali liquor is introduced into the alkali liquor heating device.

In a possible embodiment, a third heat exchanger is further included, and the third heat exchanger is configured to perform heat exchange between process water and the hot air passing through the second heat exchanger.

As the hot air output from the hot air generating device needs to be adjusted to be within a suitable range, the hot air passing through the second heat exchanger cannot be introduced too much, then a part of the hot air passing through the second heat exchanger may not need to be introduced into the hot air generating device, hence, the remaining hot air undergoes heat exchange with the process water at the third heat exchanger, thus, the process water may be heated to improve the utilization rate of heat in the whole production system.

In a possible embodiment, a first hot air pipeline is further included, wherein the first hot air pipeline passes through the second heat exchanger and the third heat exchanger, and the first hot air pipeline is provided with a second valve located between the second heat exchanger and the third heat exchanger.

Through the arrangement of the second valve, the second valve may cooperate with the first valve, so as to adjust the amount of hot air entering the hot air generating device after passing through the second heat exchanger, and the amount of hot air passing through the third heat exchanger, so that the heat utilization rate of the whole production system is higher, and the temperature of each process node of the production system may be within a suitable range.

In a possible embodiment, a process water pipeline is further included, wherein the process water pipeline is configured to deliver the process water having undergone heat exchange by the third heat exchanger into the potassium manganate separation device.

The pre-heated process water may dissolve the separated potassium manganate, so that the potassium manganate is used in a subsequent process.

In a possible embodiment, a side wall of the reaction column is provided with a plurality of first reaction gas inlets from top to bottom, and each first reaction gas inlet is configured to introduce the oxygen-enriched reaction gas having undergone the heat exchange. A plurality of reaction zones may be formed inside the reaction column, so as to improve the utilization rate of manganese dioxide.

In a possible embodiment, a lower end of the reaction column is provided with a second reaction gas inlet, wherein the second reaction gas inlet is in communication with a cavity inside the reaction column, the second reaction gas inlet is configured to enable the lower end of the reaction column to be introduced with the oxygen-enriched reaction gas having undergone the heat exchange.

After the reaction inside the reaction column, a part of the residual manganese dioxide will be output from the bottom of the column, therefore, the lower end of the reaction column is provided with the second reaction gas inlet, so that the unreacted manganese dioxide reacts with the oxygen-enriched reaction gas at the bottom of the column, thereby further improving the conversion rate of manganese dioxide.

In a second aspect, an embodiment of the present disclosure provides a production method of potassium manganate, applicable to the above production system of potassium manganate, wherein the production method includes: making the hot air generated by the hot air generating device to heat materials in the production device and performing heat preservation, and introducing the hot air passing through the production device into the hot air generating device through the circulating air pipeline, so as to adjust the temperature of the hot air generated in the hot air generating device.

The hot air passing through the production device is introduced into the hot air generating device through the circulating air pipeline, and may be mixed with the hot air generated by the combustion of the fuel gas, thereby adjusting the temperature of the hot air in the whole production system, so as to meet the production requirements of potassium manganate. Furthermore, as the hot air passing through the production device is again introduced into the hot air generating device through the circulating air pipeline, residual heat further may be utilized, thereby saving energy and reducing emissions.

In a possible embodiment, the production device includes an alkali liquor heating device, a first heat exchanger and a reaction column. The production method includes: introducing the hot air passing through the reaction column into the hot air generating device through the circulating air pipeline, so as to mix the hot air passing through the reaction column with the hot air generated by combustion of fuel gas in the hot air generator and control the temperature of the hot air to be 600~800° C. After passing through the alkali liquor heating device, the 600~800° C. hot air causes the temperature of the alkali liquor in the alkali liquor heating device to be ≥250° C. The hot air is of a temperature of 300~350° C. after passing through the alkali liquor heating device, and the 300~350° C. hot air heats the oxygen-enriched reaction gas at the first heat exchanger, so that the temperature of the heated oxygen-enriched reaction gas is 250° C. or higher. The hot air passing through the first heat exchanger and the heated oxygen-enriched reaction gas having a temperature of 250° C. or higher are introduced into the reaction column, to control the temperature in the reaction column to be 250~270° C.

The hot air passing through the reaction column is circulated into the hot air generating device through the circulating air pipeline, so as to adjust the temperature of the hot air output from the hot air generating device to be 600~800° C., and after the hot air passes through the alkali liquor heating device, the alkali liquor in the alkali liquor heating device may be heated, so that the temperature of the alkali liquor in the alkali liquor heating device is 250° C. After passing through the alkali liquor heating device, the hot air is 300~350° C., and the hot air undergoes heat exchange with the oxygen-enriched reaction gas at the first heat exchanger, then the temperature of the oxygen-enriched reaction gas may be heated to 250° C. or higher. The heated oxygen-enriched reaction gas and the hot air having undergone the heat exchange by the first heat exchanger are introduced into the reaction column, so that the temperature inside the reaction column is 250~270° C. Thus, the temperature of each process node in the production system is controlled to be within a certain range, so as to meet the production requirements of potassium manganate.

First Embodiment: FIG. 1 is a structural schematic view of a first flow of a production system of potassium manganate provided in an embodiment of the present disclosure. Referring to FIG. 1, directions indicated by arrows in FIG. 1 are a flowing direction of a fluid, and in the embodiment of the present disclosure, the production system of potassium manganate includes a hot air generating device 10 and a production device 20. The hot air generating device 10 is configured to provide hot air in a manner of burning fuel gas. Optionally, the fuel gas may be natural gas.

The hot air generating device 10 includes a hot air generator 11 and a hot air conveyor 12, and the hot air generator 11 is configured to provide hot air in a manner of burning the fuel gas. The hot air generator 11 has a fuel gas inlet 111 and a combustion-supporting gas inlet 112 at one end, the fuel gas inlet 111 is communicated with the fuel gas pipeline 1111, and the combustion-supporting gas inlet 112 is communicated with the combustion-supporting gas pipeline 1121. After the fuel gas and the combustion-supporting gas (for example, air) are introduced into the hot air generator 11, the fuel gas and the combustion-supporting gas are burned, thereby generating the hot air (i.e. fume carrying heat generated after combustion).

The hot air generator 11 is directly connected to and communicated with the hot air conveyor 12, the end of the hot air generator 11 away from the fuel gas inlet 111 and the combustion-supporting gas inlet 112 is connected to the hot air conveyor 12, the hot air conveyor 12 has a hot air circulation passage 121 therein, and the hot air circulation passage 121 is configured for the hot air generated by the hot air generator 11 to pass therethrough. The end of the hot air generator 11 away from the fuel gas inlet 111 and the combustion-supporting gas inlet 112 is provided with a hot air opening 113, and the arrangement of the hot air opening 113 may allow the hot air generator 11 to be communicated with the hot air circulation passage 121.

In an embodiment of the present disclosure, as it is fuel gas that is combusted in the hot air generator 11, there is no need to provide a dust removing device between the hot air generator 11 and the hot air conveyor 12, and there is also no need to provide a pipeline between the hot air generator 11 and the hot air conveyor 12, while they may be directly connected and communicated, so that the structure of the hot air generating device 10 is more compact, and heat loss is reduced.

Further, the production device 20 is configured to absorb heat in the hot air generated by the hot air generating device 10. After the hot air passes through the production device 20, a part of heat is utilized by the production device 20.

In an embodiment of the present disclosure, the production device 20 includes an alkali liquor heating device 21, a first heat exchanger 22 and a reaction column 23. The hot air generated in the hot air generator 11, after passing through the alkali liquor heating device 21, the first heat exchanger 22 and the reaction column 23, may absorb a part of heat in the hot air, so that the temperature of the hot air may be lowered.

Optionally, the alkali liquor heating device 21 is configured to absorb heat in the hot air generated by the hot air generating device 10 and heat the alkali liquor in the alkali liquor heating device 21. The alkali liquor heating device 21 is provided in the hot air circulation passage 121, and an internal structure of the hot air circulation passage 121 is not limited, and may be adjusted according to the structure of the alkali liquor heating device 21.

Further, the alkali liquor heating device 21 has an inner cavity 211 accommodating the alkali liquor, and an outer shell forming the inner cavity 211 is located in the hot air circulation passage 121. The hot air, when flowing through the hot air circulation passage 121, may heat the outer shell of the alkali liquor heating device 21, and further heat the alkali liquor in the inner cavity 211. A first end of the alkali liquor heating device 21 is located outside the hot air conveyor 12, and the first end is provided with an alkali liquor inlet 212 and an alkali liquor outlet 213. Optionally, a lower end (the end for loading the alkali liquor) of the alkali liquor heating device 21 (for example, a solid caustic soda pot) is located in the hot air circulation passage 121, so as to heat the alkali liquor in the solid caustic soda pot. An upper end of the alkali liquor heating device 21 (for example, the solid caustic soda pot) is provided with an alkali liquor inlet 212 and an alkali liquor outlet 213, and the alkali liquor outlet 213 is in communication with the reaction column 23 so as to deliver the alkali liquor into the alkali liquor heating device 21 or deliver the heated alkali liquor into the reaction column 23 for reaction. The alkali liquor may be input from the outside at the alkali liquor inlet 212.

In an embodiment of the present disclosure, the end of the hot air circulation passage 121 away from the hot air opening 113 is provided with a hot air outlet of reaction column 2322, so that the hot air passing through the hot air circulation passage 121 is output from the hot air conveyor 12 for heating in a subsequent process.

Optionally, the hot air conveyor 12 is provided thereon with a vent port 123, and the vent port 123 is in communication with the hot air circulation passage 121, to avoid a too high air pressure inside the hot air conveyor 12, so that the hot air is located within a suitable range of intensity of pressure in the conveying process, for example, a negative pressure is −50~−10 Pa, which may improve the use safety of the production system.

In an embodiment of the present disclosure, the first heat exchanger 22 is configured to enable the oxygen-enriched reaction gas to undergo heat exchange with the hot air passing through the alkali liquor heating device 21, and the reaction column 23 is configured to receive the heated alkali liquor from the alkali liquor heating device 21 and the oxygen-enriched reaction gas and the hot air having undergone the heat exchange from the first heat exchanger 22.

The hot air in the hot air conveyor 12 passes through the alkali liquor heating device 21, and the hot air output from the hot air conveyor 12 enters the reaction column 23 through the first heat exchanger 22, to be utilized. Optionally, the reaction column 23 has a feeding section 231, a reaction section 232 and a separation section 233, and the feeding section 231, the reaction section 232 and the separation section 233 are arranged, connected and communicated in sequence from top to bottom.

The feeding section 231 is mainly for adding manganese mineral powder and alkali liquor and discharging exhaust gas. An alkali liquor inlet 2311, a residual air outlet 2312 and a manganese mineral powder inlet 2313 are provided on the feeding section 231. The alkali liquor inlet 2311 of the reaction column 23 is communicated with the alkali liquor outlet 213 of the alkali liquor heating device 21 through the alkali liquor pipeline 214. The alkali liquor pipeline 214 is provided with a first liquid delivery pump 215, and through the arrangement of the first liquid delivery pump 215, the heated alkali liquor may be output from the alkali liquor outlet 213 of the alkali liquor heating device 21, and enters the reaction column 23 from the alkali liquor inlet 2311 of the reaction column 23 after passing through the first liquid delivery pump 215.

The residual air outlet 2312 is located at an upper end of the feeding section 231, that is, at an upper end of the reaction column 23, so as to discharge the exhaust gas. The manganese mineral powder inlet 2313 is connected to a spiral automatic feeder 234, and the manganese mineral powder is delivered by the spiral automatic feeder 234 from the manganese mineral powder inlet 2313 into the reaction column 23.

The reaction section 232 of the reaction column 23 is provided with a hot air inlet of reaction column 2321 and a hot air outlet of reaction column 2322, and the hot air inlet of reaction column 2321 is communicated with a conveyor hot air outlet 122 of the hot air conveyor 12 through a second hot air pipeline 114. The oxygen-enriched reaction gas is delivered through a reaction gas pipeline 30. The reaction gas pipeline 30 and the second hot air pipeline 114 both pass through the first heat exchanger 22, so that the oxygen-enriched reaction gas in the reaction gas pipeline 30 is subjected to heat exchange with the hot air in the second hot air pipeline 114 at the first heat exchanger 22, so as to pre-heat the oxygen-enriched reaction gas, and introduce the pre-heated oxygen-enriched reaction gas into the reaction column 23. It should be noted that the oxygen-enriched reaction gas may be compressed air or a mixture of oxygen and compressed air.

A side wall of the reaction column 23 is provided with a plurality of first reaction gas inlets 2323 from top to bottom, and each first reaction gas inlet 2323 is configured to introduce the oxygen-enriched reaction gas having undergone the heat exchange. In an embodiment of the present disclosure, the side wall of the reaction section 232 is provided with three first reaction gas inlets 2323, a side wall of the separation section 233 is provided with one first reaction gas inlet 2323, and the four first reaction gas inlets 2323 are all in communication with the reaction gas pipeline 30, so that the pre-heated oxygen-enriched reaction gas is introduced into the reaction column 23. The arrangement of a plurality of first reaction gas inlets 2323 may form more reaction zones where the oxygen-enriched reaction gas is in contact with the alkali liquor and the manganese mineral powder inside the reaction column 23, so that the conversion rate of the manganese mineral powder is higher.

Further, a lower end of the reaction column 23 is provided with a second reaction gas inlet 2331, wherein the second reaction gas inlet 2331 is in communication with a cavity inside the reaction column 23, the second reaction gas inlet 2331 is configured to allow the lower end of the reaction column 23 to introduce the oxygen-enriched reaction gas having undergone the heat exchange. That is to say, the lower end of the separation section 233 is provided with a drainage port 2332, and the drainage port 2332 may discharge the reacted materials out of the reaction column 23. A part of the manganese dioxide may remain in the reacted materials. The second reaction gas inlet 2331 is communicated with the drainage port 2332. Through the arrangement of the second reaction gas inlet 2331, the unreacted manganese dioxide may be reacted with the oxygen-enriched reaction gas in the separation section 233, so as to further improve the conversion rate of manganese dioxide.

Continuing to refer to FIG. 1, in an embodiment of the present disclosure, the production system further includes a potassium manganate crystallization device 40 and a potassium manganate separation device 50, and the potassium manganate crystallization device 40 is in communication with a bottom of the reaction column 23. A three-way valve 2333 may be provided at the drainage port 2332, wherein a first connector of the three-way valve 2333 is communicated with the drainage port 2332, a second connector of the three-way valve 2333 is communicated with the second reaction gas inlet 2331, and a third connector of the three-way valve 2333 is communicated with the potassium manganate crystallization device 40. By controlling a valve core of the three-way valve 2333, the reaction gas is controlled to enter the reaction column 23 or the reacted materials are controlled to enter the potassium manganate crystallization device 40.

The potassium manganate separation device 50 is communicated with the potassium manganate crystallization device 40, the potassium manganate separation device 50 is communicated with the alkali liquor inlet 212, so that the alkali liquor separated from the potassium manganate separation device 50 enters the alkali liquor heating device 21. The reacted materials enter the potassium manganate crystallization device 40 to be crystallized after passing through the three-way valve 2333 via the drainage port 2332, and then enters the potassium manganate separation device 50 to separate the potassium manganate from the unreacted alkali liquor, and the separated alkali liquor is introduced into the alkali liquor heating device 21 through the alkali liquor inlet 212, facilitating the recovery of the alkali liquor.

Further, the hot air inlet of reaction column 2321 is located on a side of the reaction section 232 close to the feeding section 231, and the hot air outlet of reaction column 2322 is located on a side of the reaction section 232 close to the separation section 233. The hot air outlet of reaction column 2322 is provided with a first hot air pipeline 235, the first hot air pipeline 235 is provided with an induced draft fan 236, and under the action of the induced draft fan 236, the hot air in the reaction column 23 is enabled to flow from top to bottom and then output through the first hot air pipeline 235, so that the hot air flows counter to the materials in the reaction column 23, and the hot air and the materials have a big temperature difference therebetween, then the heat exchange effect is enhanced, and the materials in the reaction column 23 are heated and insulated.

In an embodiment of the present disclosure, in order to further utilize the hot air in the first hot air pipeline 235, the first hot air pipeline 235 is provided with a second heat exchanger 60, the induced draft fan 236 is located between the hot air outlet of reaction column 2322 and the second heat exchanger 60, and the combustion-supporting gas pipeline 1121 also passes through the second heat exchanger 60. The second heat exchanger 60 is configured to perform heat exchange between the combustion-supporting gas and the hot air passing through the reaction column 23. The hot air in the first hot air pipeline 235 and the combustion-supporting gas in the combustion-supporting gas pipeline 1121 exchange heat at the second heat exchanger 60. The combustion-supporting gas pipeline 1121 is configured to introduce the combustion-supporting gas passing through the second heat exchanger 60 into the hot air generating device 10, to pre-heat the combustion-supporting gas by using the heat in the hot air, so that the pre-heated combustion-supporting gas may be input into the hot air generator 11 through the combustion-supporting gas inlet 112. Heat in the hot air may be further utilized.

Optionally, the combustion-supporting gas pipeline 1121 is provided with a combustion-supporting gas blower 1122, and through the arrangement of the combustion-supporting gas blower 1122, the combustion-supporting gas may be introduced into the combustion-supporting gas pipeline 1121, so as to pre-heat the combustion-supporting gas and introduce the pre-heated combustion-supporting gas into the hot air generator 11.

In order to further utilize the hot air in the first hot air pipeline 235, the first hot air pipeline 235 is provided with a third heat exchanger 70, and the third heat exchanger 70 is located at a rear end of the second heat exchanger 60, that is to say, the hot air in the first hot air pipeline 235 first passes through the second heat exchanger 60 and then passes through the third heat exchanger 70. The third heat exchanger 70 is configured to perform heat exchange between the process water and the hot air passing through the second heat exchanger 60.

In order to exchange heat between the process water and the hot air in the first hot air pipeline 235 at the third heat exchanger 70, a process water pipeline 71 delivering the process water passes through the third heat exchanger 70, so as to pre-heat the process water. As the process water pipeline 71 is configured to deliver the process water that has undergone heat exchange by the third heat exchanger 70 into the potassium manganate separation device 50, the pre-heated process water is delivered to the potassium manganate separation device 50 through the process water pipeline 71, and thus the separated potassium manganate may be dissolved, thus facilitating use of potassium manganate in a subsequent process.

In order to adjust the temperature of the hot air output from the hot air opening 113 of the hot air generator 11, a circulating air inlet 115 is provided on the hot air generator 11, a circulating air pipeline 116 is connected at the circulating air inlet 115, and the circulating air pipeline 116 is configured to introduce the hot air passing through the production device 20 into the hot air generator 11 to adjust the temperature of the hot air. Further, the circulating air pipeline 116 is configured to introduce the hot air passing through the reaction column 23 into the hot air generator 11. Still further, the circulating air pipeline 116 is configured to introduce the hot air having undergone the heat exchange by the second heat exchanger 60 into the hot air generating device 10.

Hence, the circulating air pipeline 116 has one end in communication with the circulating air inlet 115, and the other end in communication with the first hot air pipeline 235, and a connection part between the circulating air pipeline 116 and the first hot air pipeline 235 is located between the second heat exchanger 60 and the third heat exchanger 70. The circulating air pipeline 116 is provided thereon with a circulating air blower 118, and under the action of the circulating air blower 118, the hot air in the first hot air pipeline 235 may be introduced into the circulating air pipeline 116, and enters the hot air generator 11 through the circulating air inlet 115.

In normal cases, the temperature of flame may reach 1000° C. or higher when natural gas burns, that is to say, if the circulating air is not introduced into the hot air generator 11, the temperature of the hot air output from the hot air opening 113 into the hot air circulation passage 121 is very high, up to 1000° C. or higher, which is not conducive to the temperature control of each process node in the production system.

After the hot air passing through the alkali liquor heating device 21, the first heat exchanger 22, the reaction column 23 and the second heat exchanger 60, most of the heat of the hot air has been utilized, then the temperature of the hot air is lowered. The hot air having a lowered temperature is introduced into the hot air generator 11 through the circulating air pipeline 116, so that the hot air generated by combustion of natural gas is mixed with the hot air having a lower temperature, to adjust the temperature of the hot air delivered from the hot air opening 113 to be 600~800° C., so that the temperature of the hot air entering the hot air circulation passage 121 is 600~800° C. (the temperature is lowered), and heat in the hot air may be further utilized, thereby saving energy and reducing emissions.

In order to control the temperature of the mixed hot air to be 600~800° C., a first valve 117 may be provided on the circulating air pipeline 116. Through the arrangement of the first valve 117, the flow rate of the hot air entering the hot air generator 11 after passing through the second heat exchanger 60 may be adjusted, thus avoiding too much hot air from being introduced into the hot air generator 11, and preventing a too high or too low temperature of the hot air output by the hot air generator 11, so as to adjust the temperature of the hot air output by the hot air generating device 10 to be within a suitable range.

Further, the first hot air pipeline 235 is provided with a second valve 72, wherein the second valve 72 is located between the third heat exchanger 70 and the second heat exchanger 60, and the second valve 72 is located between the third heat exchanger 70 and the connection part between the circulating air pipeline 116 and the first hot air pipeline 235. Through the arrangement of the second valve 72, the second valve may cooperate with the first valve 117 so as to adjust the amount of hot air entering the hot air generator 11 after passing through the second heat exchanger 60, and the amount of hot air passing through the third heat exchanger 70, so that the heat utilization rate of the whole production system is higher, and thus the temperature of each process node of the production system may be within a suitable range.

In an embodiment of the present disclosure, after passing through the alkali liquor heating device 21 in the hot air circulation passage 121, the 600~800° C. hot air heats the alkali liquor in the solid caustic soda pot, so that the temperature of the alkali liquor is 250° C., and a negative pressure of the hot air in the hot air circulation passage 121 is controlled at −50~-10 Pa. Meanwhile, after the hot air passes through the alkali liquor heating device 21, the temperature of the hot air output from the conveyor hot air outlet 122 is 300~350° C., and the 300~350° C. hot air in the second hot air pipeline 114 undergoes heat exchange with the oxygen-enriched reaction gas in the reaction gas pipeline 30 at the first heat exchanger 22, so that the temperature of the oxygen-enriched reaction gas is 250° C. or higher.

The hot air passing through the first heat exchanger 22 enters the reaction column 23 from the hot air inlet of reaction column 2321, the oxygen-enriched reaction gas having a temperature greater than 250° C. passing through the first heat exchanger 22 enters the reaction column 23 from the plurality of first reaction gas inlets 2323 and the second reaction gas inlet 2331, thereby controlling the temperature in the reaction column 23 to be 250~270° C.

Under the action of the induced draft fan 236, the hot air in the reaction column 23 is output to the first hot air pipeline 235 through the hot air outlet of reaction column 2322, and the hot air in the first hot air pipeline 235 undergoes heat exchange with the combustion-supporting gas in the combustion-supporting gas pipeline 1121 at the second heat exchanger 60, to pre-heat the combustion-supporting gas, and the pre-heated combustion-supporting gas is introduced into the hot air generator 11 through the combustion-supporting gas inlet 112.

A part of the hot air passing through the second heat exchanger 60, after passing through the second valve 72, continues to pass through the third heat exchanger 70. The hot air in the first hot air pipeline 235 undergoes heat exchange with the process water in the process water pipeline 71 at the third heat exchanger 70, to pre-heat the process water and thus obtain the process water with a temperature of 80~90° C. After the hot air passes through the third heat exchanger 70, the temperature of the hot air discharged from the production system is 120~150° C. Through the above system, the flow rate of the discharged hot air may be reduced, the temperature of the hot air is also lower, and the utilization rate of heat is higher.

The other part of hot air, after passing through the first valve 117, is introduced into the circulating air pipeline 116 through the circulating air fan 118, and is delivered to the hot air generator 11 to adjust the temperature of the hot air, so that the temperature of the hot air output from the hot air opening 113 is 600~800° C. The cycle is carried out in this way.

The beneficial effects of the production system and the production method of potassium manganate provided in the embodiments of the present disclosure include:

(1) the hot air generated by the hot air generator 11 is utilized multiple times: heating the alkali liquor in the solid caustic soda pot for the first time; heating the oxygen-enriched reaction gas passing through the first heat exchanger 22 for the second time; heating and insulating the reaction column 23 for the third time; heating the combustion-supporting gas passing through the second heat exchanger 60 for the fourth time; and heating the process water passing through the third heat exchanger 70 for the fifth time, the heat utilization rate of combustion of natural gas may be improved, the heat utilization rate of the production system reaches 95% or greater, and the effective volume production capacity of the reaction column 23 reaches 0.035~0.04 t/m$^3$·h;

(2) the temperature of the hot air discharged at the hot air opening 113 may be adjusted under the action of the circulating air pipeline 116, so as to control the temperature range of each process node in the production system, so that the temperature of each process node is within an optimal temperature range, thus improving the production capacity of potassium manganate and reducing the production cost. Moreover, through the arrangement of the circulating air pipeline 116, the hot air may be further utilized, thereby improving the utilization rate of hot air;

(3) by lowering the temperature of the hot air discharged from the hot air opening 113, other pipelines and devices of the whole production system may be operated in a relatively low temperature range, which reduces the material requirements to the devices and pipelines, extends the use cycle of the devices, and saves a large amount of device investment and maintenance costs; and (4) by providing the second reaction gas inlet 2331 at the drainage port 2332, the conversion rate of manganese dioxide may be improved, and thus the production cost may be reduced.

Second Embodiment: the present embodiment provides a production system of potassium manganate. The present embodiment is an improvement made on the basis of the technical solution of the first embodiment. The technical solution described in the first embodiment is also applicable to the present embodiment. The technical solution that has been disclosed in the first embodiment is not repeated again. The present embodiment is different from the first embodiment in that the mounting position of one end of the circulating air pipeline 116 away from the hot air generator 11 is different.

Figure 2:
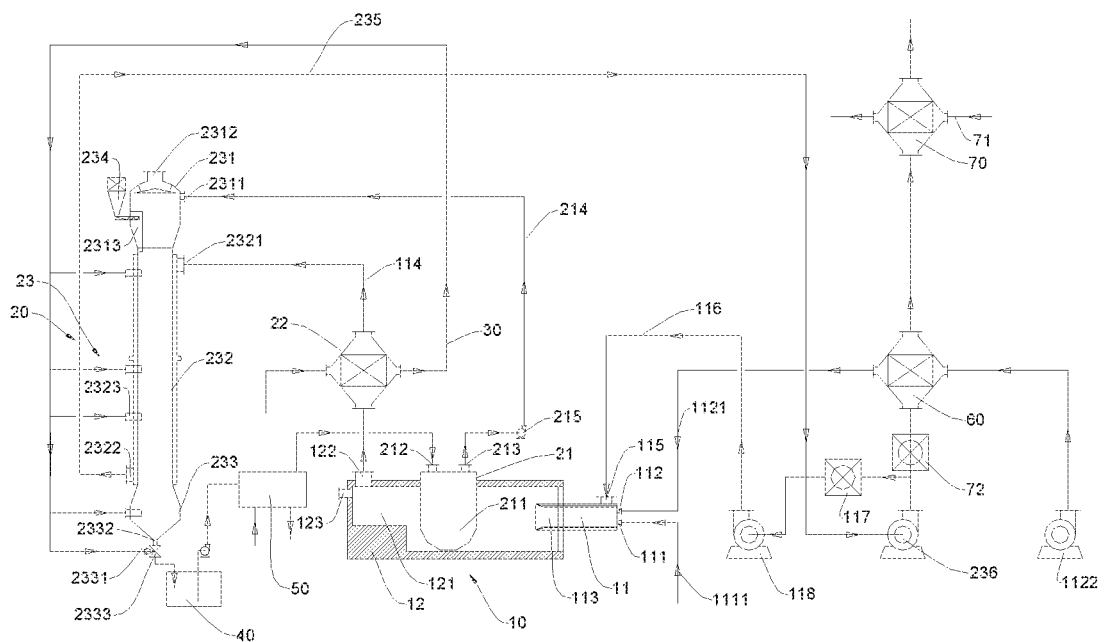
FIG. 2 is a structural schematic view of a flow of a production system of potassium manganate provided in a second embodiment of the present disclosure.

FIG. 2 is a structural schematic view of a second flow of a production system of potassium manganate provided in an embodiment of the present disclosure. Referring to FIG. 2, directions indicated by arrows in FIG. 2 are a flowing direction of a fluid. In the embodiment of the present disclosure, the circulating air pipeline 116 is configured to introduce the hot air passing through the production device 20 into the hot air generator 11 to adjust the temperature of the hot air. Further, the circulating air pipeline 116 is configured to introduce the hot air passing through the reaction column 23 into the hot air generator 11.

The circulating air pipeline 116 has one end in communication with the circulating air inlet 115, and the other end in communication with the first hot air pipeline 235, and a connection part between the circulating air pipeline 116 and the first hot air pipeline 235 is located between the second heat exchanger 60 and the reaction column 23. Further, an end of the circulating air pipeline 116 away from the hot air generator 11 is located between the induced draft fan 236 and the second heat exchanger 60. The circulating air pipeline 116 is provided thereon with a circulating air blower 118, and under the action of the circulating air blower 118, the hot air in the first hot air pipeline 235 may be introduced into the circulating air pipeline 116, and enters the hot air generator 11 through the circulating air inlet 115.

The hot air in the first hot air pipeline 235, after being output from the reaction column 23, is divided after passing through the induced draft fan 236, then a part of the hot air is delivered into the hot air generator 11 through the circulating air pipeline 116, so as to adjust the temperature of the hot air output from the hot air opening 113 of the hot air generator 11, and a part of the hot air is continuously delivered in the first hot air pipeline 235, to pre-heat the combustion-supporting gas by the second heat exchanger 60, then pre-heats the process water by the third heat exchanger 70, and then is discharged from the production system.

In the embodiment of the present disclosure, the circulating air pipeline 116 is provided with the first valve 117, the first hot air pipeline 235 is provided with the second valve 72, and the second valve 72 is located between the induced draft fan 236 and the second heat exchanger 60, that is to say, the second valve 72 is located between the connection part of the first hot air pipeline 235 and the circulating air pipeline 116, and the second heat exchanger 60, so as to adjust the amount of hot air entering the hot air generator 11 and adjust the amount of hot air passing through the second heat exchanger 60.

Third Embodiment: the present embodiment provides a production system of potassium manganate. The present embodiment is an improvement made on the basis of the technical solution of the first embodiment. The technical solution described in the first embodiment is also applicable to the present embodiment. The technical solution that has been disclosed in the first embodiment is not repeated again. The present embodiment is different from the first embodiment in that the mounting position of one end of the circulating air pipeline 116 away from the hot air generator 11 is different.

Figure 3:
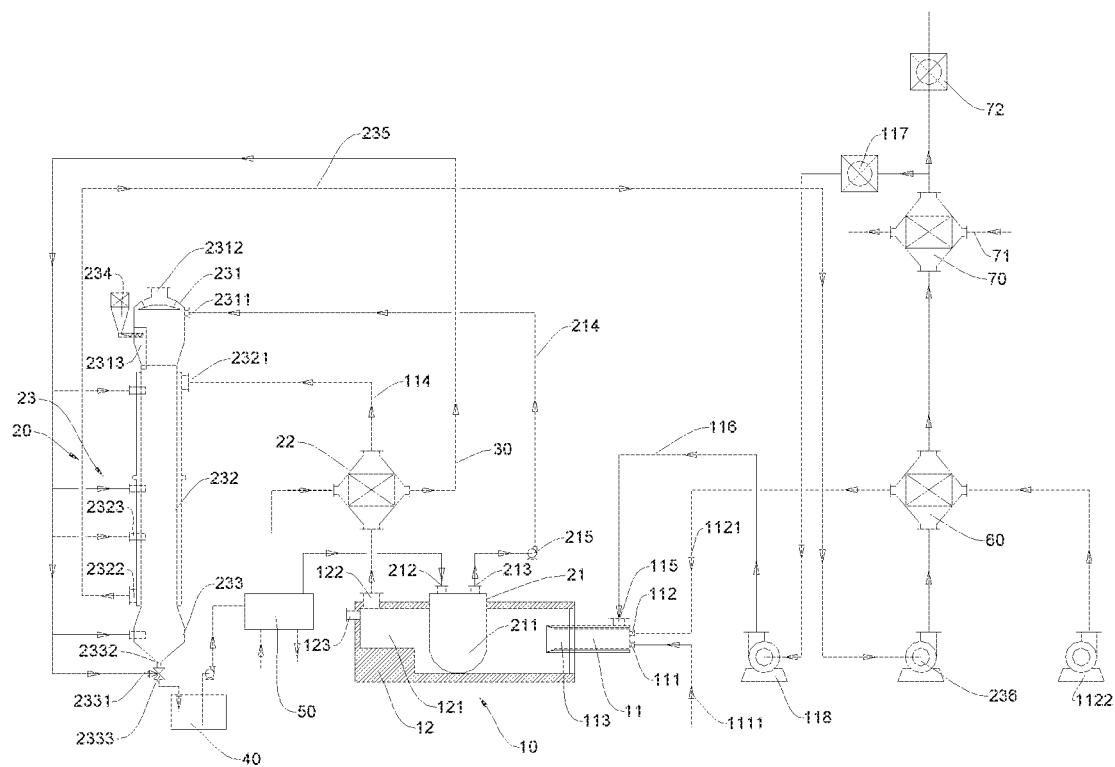
FIG. 3 is a structural schematic view of a flow of a production system of potassium manganate provided in a third embodiment of the present disclosure.

FIG. 3 is a structural schematic view of a third flow of the production system of potassium manganate provided in an embodiment of the present disclosure; Referring to FIG. 3, directions indicated by arrows in FIG. 3 are a flowing direction of a fluid. In the embodiment of the present disclosure, the circulating air pipeline 116 is configured to introduce the hot air passing through the production device 20 into the hot air generator 11 to adjust the temperature of the hot air. Further, the circulating air pipeline 116 is configured to introduce the hot air passing through the reaction column 23 into the hot air generator 11. Still further, the circulating air pipeline 116 is configured to introduce the hot air having undergone the heat exchange by the third heat exchanger 70 into the hot air generating device 10.

The circulating air pipeline 116 has one end in communication with the circulating air inlet 115, and the other end in communication with the first hot air pipeline 235, and a connection part between the circulating air pipeline 116 and the first hot air pipeline 235 is located behind the third heat exchanger 70. Further, after passing through the third heat exchanger 70, the first hot air pipeline 235 is connected to the end of the circulating air pipeline 116 away from the hot air generator 11. The circulating air pipeline 116 is provided thereon with a circulating air blower 118, and under the action of the circulating air blower 118, the hot air passing through the third heat exchanger 70 may be introduced into the circulating air pipeline 116, and enters the hot air generator 11 through the circulating air inlet 115.

The hot air in the first hot air pipeline 235, after passing through the third heat exchanger 70, is divided, then a part of the hot air is delivered into the hot air generator 11 through the circulating air pipeline 116, so as to adjust the temperature of the hot air output from the hot air opening 113 of the hot air generator 11, and a part of the hot air is discharged from the production system through an end portion of the first hot air pipeline 235.

In the embodiment of the present disclosure, the circulating air pipeline 116 is provided with the first valve 117, the first hot air pipeline 235 is provided with the second valve 72, and the second valve 72 is located at an end of the third heat exchanger 70 away from the second heat exchanger 60, so as to adjust the amount of hot air entering the hot air generator 11 and adjust the amount of hot air discharged from the production system.

Fourth Embodiment: the present embodiment provides a production system of potassium manganate. The present embodiment is an improvement made on the basis of the technical solution of the second embodiment. The technical solution described in the second embodiment is also applicable to the present embodiment. The technical solution that has been disclosed in the second embodiment is not repeated again. The present embodiment is different from the second embodiment in that the hot air passes through various devices of the production device 20 in a different order.

Figure 4:
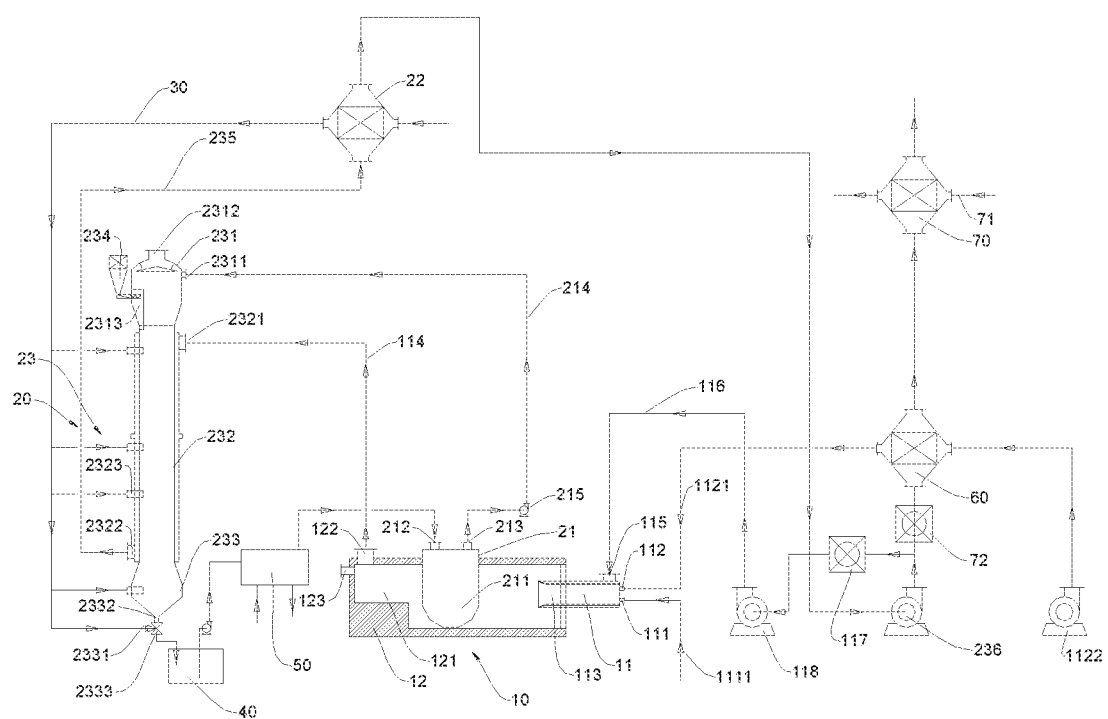
FIG. 4 is a structural schematic view of a flow of a production system of potassium manganate provided in a fourth embodiment of the present disclosure.

FIG. 4 is a structural schematic view of a fourth flow of the production system of potassium manganate provided in an embodiment of the present disclosure. Referring to FIG. 4, directions indicated by arrows in FIG. 4 are a flowing direction of a fluid, and in the embodiment of the present disclosure, the production device 20 includes an alkali liquor heating device 21, a reaction column 23 and a first heat exchanger 22. After the hot air generated in the hot air generator 11 passes through the alkali liquor heating device 21, the reaction column 23 and the first heat exchanger 22, a part of heat in the hot air may be absorbed, so that the temperature of the hot air is lowered.

In the embodiment of the present disclosure, the hot air in the hot air conveyor 12 passes through the alkali liquor heating device 21, and the hot air output from the conveyor hot air outlet 122 of the hot air conveyor 12 enters the reaction column 23, then the hot air is utilized. Under the action of the induced draft fan 236, the hot air is introduced from the hot air outlet of reaction column 2322 of the reaction column 23 into the first hot air pipeline 235, and the first heat exchanger 22 is provided on the first hot air pipeline 235.

The first heat exchanger 22 is configured to enable the oxygen-enriched reaction gas to undergo heat exchange with the hot air passing through the reaction column 23, and the reaction column 23 is configured to receive the heated alkali liquor from the alkali liquor heating device 21 and the oxygen-enriched reaction gas and hot air having undergone the heat exchange from the first heat exchanger 22. The oxygen-enriched reaction gas, after passing through the first heat exchanger 22, is delivered into the reaction column 23 through the first reaction gas inlet 2323 and the second reaction gas inlet 2331, and after passing through the first heat exchanger 22, the hot air continues to pass through the second heat exchanger 60 and the third heat exchanger 70 via the first hot air pipeline 235.

Optionally, the circulating air pipeline 116 is configured to introduce the hot air passing through the first heat exchanger 22 into the hot air generator 11. The circulating air pipeline 116 has one end in communication with the circulating air inlet 115, and the other end in communication with the first hot air pipeline 235, and a connection part between the circulating air pipeline 116 and the first hot air pipeline 235 is located between the first heat exchanger 22 and the second heat exchanger 60. Further, the end of the circulating air pipeline 116 away from the hot air generator 11 is located between the induced draft fan 236 and the second heat exchanger 60. The circulating air pipeline 116 is provided thereon with a circulating air blower 118, and under the action of the circulating air blower 118, the hot air in the first hot air pipeline 235 may be introduced into the circulating air pipeline 116, and enters the hot air generator 11 through the circulating air inlet 115.

The above-mentioned are merely for some embodiments of the present disclosure and not intended to limit the present disclosure, and for one skilled in the art, various modifications and changes may be made to the present disclosure. Any modifications, equivalent substitutions, improvements and so on made within the spirit and principle of the present disclosure should be covered within the scope of protection of the present disclosure.

What is claimed is:

1. A production system for potassium manganate, comprising:
    a hot air generating device, wherein the hot air generating device is configured to provide hot air by burning fuel gas;

a production device, wherein the production device is configured to absorb heat in hot air generated by the hot air generating device; and a circulating air pipeline, wherein the circulating air pipeline is configured to introduce hot air passing through the production device into the hot air generating device, so as to adjust a temperature of hot air;

wherein the production device comprises:

an alkali liquor heating device, wherein the alkali liquor heating device is configured to absorb heat in the hot air generated by the hot air generating device and heat alkali liquor in the alkali liquor heating device;

a first heat exchanger, wherein the first heat exchanger is configured to enable an oxygen-enriched reaction gas to undergo heat exchange with hot air passing through the alkali liquor heating device; and a reaction column, wherein the reaction column is configured to receive heated alkali liquor from the alkali liquor heating device as well as the oxygen-enriched reaction gas and hot air, having undergone the heat exchange, from the first heat exchanger, wherein the circulating air pipeline is configured to introduce hot air passing through the reaction column into the hot air generating device.

2. The production system according to claim 1, wherein the hot air generating device comprises a hot air generator and a hot air conveyor, wherein the hot air generator is configured to provide hot air by burning fuel gas, the hot air generator is directly connected to and communicated with the hot air conveyor, a hot air circulation passage is provided in the hot air conveyor, the hot air circulation passage is configured for hot air generated by the hot air generator to pass through, and the hot air circulation passage is provided therein with the alkali liquor heating device.

3. The production system according to claim 2, wherein the alkali liquor heating device has an inner cavity accommodating the alkali liquor, and an outer shell forming the inner cavity is located in the hot air circulation passage; and a first end of the alkali liquor heating device is located outside the hot air conveyor, the first end is provided with an alkali liquor inlet and an alkali liquor outlet, and the alkali liquor outlet is in communication with the reaction column.

4. The production system according to claim 3, wherein the hot air conveyor is provided with a vent port, wherein the vent port is in communication with the hot air circulation passage.

5. The production system according to claim 2, further comprising a second heat exchanger, wherein the second heat exchanger is configured to perform heat exchange between combustion-supporting gas and hot air which has passed through the reaction column; and a combustion-supporting gas pipeline, wherein the combustion-supporting gas pipeline is configured to introduce the combustion-supporting gas passing through the second heat exchanger into the hot air generating device, wherein the circulating air pipeline is configured to introduce hot air having undergone the heat exchange by the second heat exchanger into the hot air generating device.

6. The production system according to claim 5, wherein the circulating air pipeline is provided with a first valve, and the circulating air pipeline is configured to introduce hot air having undergone the heat exchange by the second heat exchanger into the hot air generator.

7. The production system according to claim 6, further comprising a potassium manganate crystallization device and a potassium manganate separation device, which are in communication with each other, wherein the potassium manganate crystallization device is in communication with a bottom of the reaction column, and the potassium manganate separation device is in communication with the alkali liquor heating device, so that alkali liquor separated by the potassium manganate separation device enters the alkali liquor heating device.

8. The production system according to claim 7, further comprising a third heat exchanger, wherein the third heat exchanger is configured to perform heat exchange between process water and hot air which has passed through the second heat exchanger.

9. The production system according to claim 8, further comprising a first hot air pipeline, wherein the first hot air pipeline passes through the second heat exchanger and the third heat exchanger, and the first hot air pipeline is provided with a second valve, wherein the second valve is located between the second heat exchanger and the third heat exchanger.

10. The production system according to claim 8, further comprising a process water pipeline, wherein the process water pipeline is configured to deliver the process water having undergone the heat exchange by the third heat exchanger into the potassium manganate separation device.

11. The production system according to claim 1, wherein a side wall of the reaction column is provided with a plurality of first reaction gas inlets from a top of the side wall to a bottom of the side wall, and each of the first reaction gas inlets is configured to introduce the oxygen-enriched reaction gas having undergone the heat exchange into the reaction column.

12. The production system according to claim 11, wherein a lower end of the reaction column is provided with a second reaction gas inlet, wherein the second reaction gas inlet is in communication with a cavity inside the reaction column, the second reaction gas inlet is configured to enable the oxygen-enriched reaction gas having undergone the heat exchange to be introduced into the lower end of the reaction column.

13. The production system according to claim 3, further comprising a second heat exchanger, wherein the second heat exchanger is configured to perform heat exchange between combustion-supporting gas and hot air which has passed through the reaction column; and a combustion-supporting gas pipeline, wherein the combustion-supporting gas pipeline is configured to introduce the combustion-supporting gas passing through the second heat exchanger into the hot air generating device, wherein the circulating air pipeline is configured to introduce hot air having undergone the heat exchange by the second heat exchanger into the hot air generating device.

14. The production system according to claim 4, further comprising a second heat exchanger, wherein the second heat exchanger is configured to perform heat exchange between combustion-supporting gas and hot air which has passed through the reaction column; and a combustion-supporting gas pipeline, wherein the combustion-supporting gas pipeline is configured to introduce the combustion-supporting gas passing through the second heat exchanger into the hot air generating device, wherein the circulating air pipeline is configured to introduce hot air having undergone the heat exchange by the second heat exchanger into the hot air generating device.

15. The production system according to claim 9, further comprising a process water pipeline, wherein the process water pipeline is configured to deliver the process water having undergone the heat exchange by the third heat exchanger into the potassium manganate separation device.

16. The production system according to claim 2, wherein a side wall of the reaction column is provided with a plurality of first reaction gas inlets from a top of the side wall to a bottom of the side wall, and each of the first reaction gas inlets is configured to introduce the oxygen-enriched reaction gas having undergone the heat exchange into the reaction column.

17. The production system according to claim 3, wherein a side wall of the reaction column is provided with a plurality of first reaction gas inlets from a top of the side wall to a bottom of the side wall, and each of the first reaction gas inlets is configured to introduce the oxygen-enriched reaction gas having undergone the heat exchange into the reaction column.

\* \* \* \* \*